Figure 1:
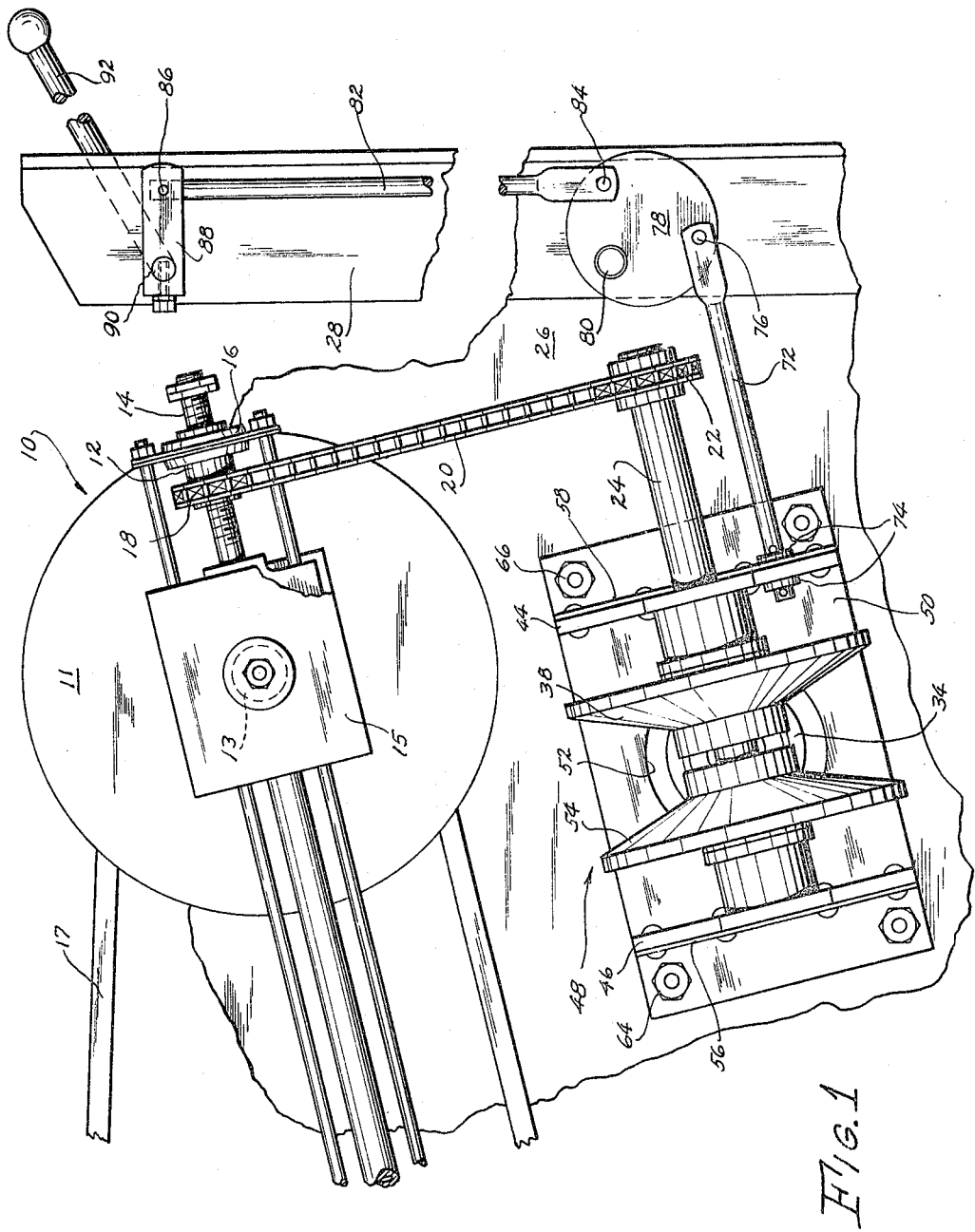

Aug. 23, 1966    M. H. WENNING    3,267,761
POWER CONTROL MECHANISM FOR A VARIABLE RATIO DRIVE
Filed May 8, 1964    2 Sheets-Sheet 2

INVENTOR.
MAURICE H. WENNING
BY
Emerson B Donnell   ATTY.
Robert D Godard    AGT.

United States Patent Office 3,267,761
Patented August 23, 1966

3,267,761
POWER CONTROL MECHANISM FOR A
VARIABLE RATIO DRIVE
Maurice H. Wenning, Moline, Ill., assignor to J. I. Case
Company, Racine, Wis., a corporation of Wisconsin
Filed May 8, 1964, Ser. No. 365,995
9 Claims. (Cl. 74—230.17)

The present application relates to control mechanism for actuating variable ratio drive mechanism, and particularly (although not exclusively) to such mechanism as is disclosed in my co-pending application disclosing a belt drive, and an object of the invention is to generally improve the construction and operation of such devices.

In large and bulky machines, such for example as harvester-threshers or combines, it is often desirable to have certain components of the machine driven at selectively variable speeds, and this is commonly accomplished by driving the components by means of what is commonly known as a variable V-belt drive. Such a drive is characterized by spaced driving and driven shafts, a compressible sheave being mounted on each shaft, and the sheaves being connected by a V-belt. The belt will run in each sheave on a pitch line or belt circle determined by the degree of compression of the sheave, and mechanism is provided which will compress one sheave, while allowing the other to expand. In this way, the belt circle in one sheave may be made different from the belt circle in the other, so that the driven shaft will run at a different speed from the driving shaft. The mechanism may be adjusted so that the belt circles will be changed to achieve any desired ratio of drive between the shafts; or in other words, any desired speed in the driven shaft within the range of the apparatus.

Such mechanism may be operated in various ways, but commonly has a rotatable element which may be turned, for example by means of a hand wheel, to alter the degree of compression of the sheaves. However, the drive just described would normally be located at a considerable distance from the operator of the machine or combine so that the operator would have to stop the machine, get off and go to the location of the speed control in order to actuate the rotatable element. Furthermore, he would commonly not be in a position to observe the effect of the adjustment until he had gone back to his operating station and restarted the machine. This might entail several trial and error operations before the desired adjustment was achieved. It accordingly would be desirable to extend the control to a position conveniently accessible to the operator. Such an arrangement would avoid stopping the combine and the several trips to the control element otherwise needed.

It is to be noted however that the adjustment may take an appreciable period of time, such for example as several seconds, during which the operator's attention could be diverted long enough to cause difficulty in the control of the combine. Accordingly, it would also be desirable to have the adjustment effected by the power of the combine, and with the simplest possible type of manipulation on the part of the operator, and in the present instance the mechanism is controlled by a simple lever which is moved in an easily remembered pattern, for example up, to cause the speed to increase, and down, to cause the speed to decrease. The actual adjustment is effected by the power of the combine, and the control is so simple that it takes nothing from the attention or concentration which the operator should be applying to the operation of the combine.

Accordingly, the principal object of the invention is to provide a control for a variable speed drive which is operated by power, which is readily extended as far as necessary from the actuated mechanism to the driver's platform or station, and which is so simple to operate that the operator will not be distracted to any significant degree from his duties in operating the machine.

Figure 2:
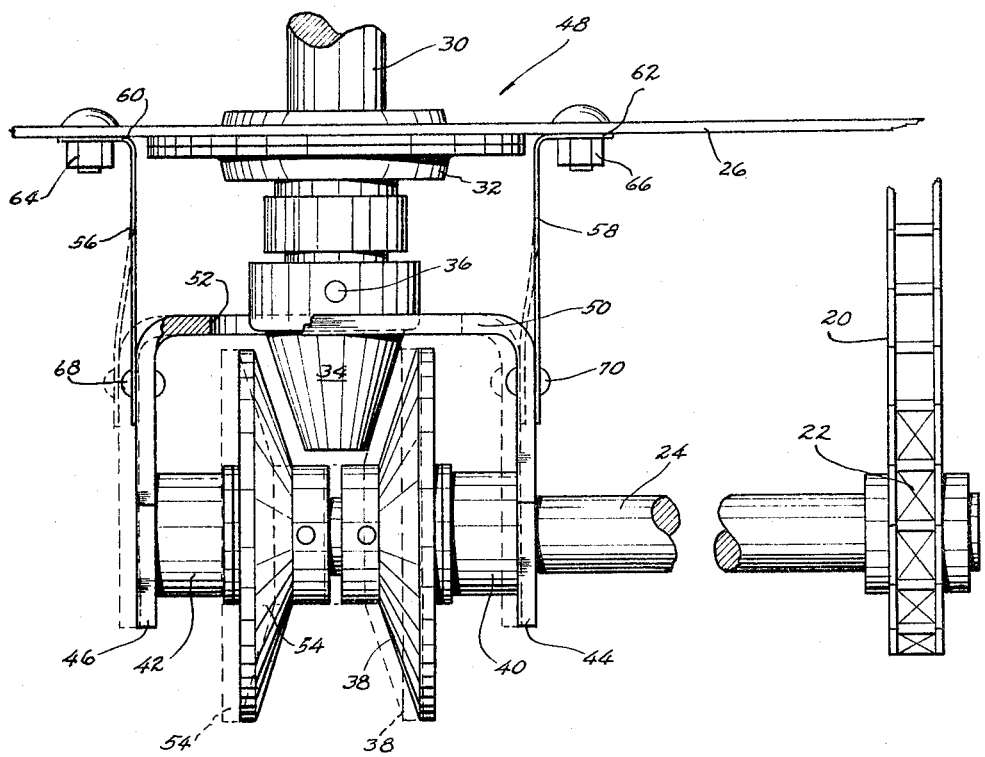

The manner in which these objects are accomplished will be fully set forth in the following specification and annexed drawings, in which:

FIGURE 1 is a fragmentary side elevation somewhat diagrammatic in character, showing a typical installation of such a speed control, embodying the invention; and FIG. 2 is a plan view of the major part of the mechanism, partly broken away.

Similar reference characters have been applied to the same parts throughout the drawings and the specification.

Turning to FIG. 1, the device is applied to a speed control represented somewhat diagrammatically in FIG. 1, and generally designated as 10, which is illustrated merely by way of example, and which need not be further disclosed except to say that it has a compressible sheave 11, on a shaft 13 and which is controlled by a thrust block assembly 15, the compression of sheave 11 affecting the pitch circle on which a belt 17 will run in sheave 11, so as to determine the speed of any element driven by belt 17. Speed control 10 also has a rotatable element 12 which is threadedly engaged with a shaft 14 and engaged in a thrust bearing 16 so that rotation of element 12 will cause relative translation of shaft 14 and bearing 16, said relative translation effecting a change in the ratio of the drive mechanism in any of a variety of suitable ways.

Element 12 has fixed thereon or otherwise secured thereto a sprocket 18 which is driven through a chain 20, from a sprocket 22 on a shaft 24, and it should be understood that other suitable power transmission means is contemplated, as for example a belt and pulleys, or the equivalent.

Shaft 24 may be made to rotate in either direction, as will be fully disclosed, from a power source on the machine or combine, and in this way the ratio of the belt drive may be readily adjusted.

As stated, the device is particularly adapted for use on a large lightly built machine, such as a combine, and it is illustrated as so used.

No. 26 represents a side wall of such a machine, commonly made of sheet metal and braced where necessary with angle irons or the like 28, the control mechanism being in the present instance entirely supported from wall 26. As seen in FIG. 2, a shaft 30 projects through wall 26 and outwardly thereof, being supported in a suitable bearing 32. Shaft 30 may be any suitable shaft in the machine which operates continuously while the machine is running. Shaft 30 constitutes a driving shaft for the control mechanism and it has a frictional driving element or cone 34 fixed on shaft 30 in any suitable manner as by a pin 36. Cone 34 may be of any suitable material, but preferably of some recognized favorable friction material, having the qualities of fiber, leather, rubber, or the like, and it may engage in driving relation with a cone-shaped flange or driven frictional element 38 fixed on above-mentioned shaft 24, and normally spaced slightly from cone 34 as will be disclosed.

Shaft 24 is carried in bearings 40 and 42 which in turn are carried in the legs 44 and 46 of a driven shaft support or yoke element, generally designated as 48. Legs 44 and 46 are connected by a web portion 50, generally normal to shaft 30 and providing a generous sized opening 52, thru which cone 34 extends between legs 44 and 46 into the proximity of cone or driven frictional element 38.

It will now be apparent that if cone 38 is brought into contact with rotating cone 34, that cone 38 will be rotated and carry with it shaft 24, thus actuating chain 20 and rotating rotatable element 12.

Shaft 24 extends generally transversely or across the end of shaft 30, or more properly cone 34, and has a generally cone-shaped driven frictional element 54 fixed thereon, cone element 54 also being spaced from driving cone or frictional element 34 at such times as the adjustment of the drive and adjusting element 12 is satisfactory.

Yoke 48 is supported from wall 26 by thin resilient brackets or leaves 56 and 58 which have out-turned flanges 60 and 62, secured to wall 26 by means of any suitable fastening means as bolts 64 and 66. Leaves 56 and 58 are preferably made of thin spring steel or some similar material and are secured to legs 46 and 44 respectively of yoke 48 by suitable means such for example as rivets 68 and 70, the legs being disposed normal or transverse to driven shaft 24, and spaced from each other in the direction of the axis, or axially of shaft 24.

Brackets or leaves 56 and 58 have sufficient stability to maintain yoke 48 with cones 54 and 38 slightly spaced from cone 34, but may be sprung or distorted, as indicated in dotted lines in FIG. 2 with relatively moderate pressure so as to guide yoke 48 in a roughly parallelogram type of motion, and bring cone 38 into frictional driven contact with rotating cone 34. Cone 38 is made of any suitable material, for example polished metal which will have a good frictional driven contact with cone 34. This will drive shaft 24 in one direction, and if leaves 56 and 58 are distorted in the opposite direction, driven element or cone 54 will be brought into contact with cone 34 and be driven so as to actuate shaft 24 in the opposite direction. When released, the inherent resiliency of brackets 56 and 58 will bring yoke 48 and its attached parts back to the neutral position shown in FIG. 2, wherein both cones 38 and 54 are spaced from cone 34, so that they and shaft 24 will remain stationary.

A push rod 72, FIG. 1 is secured to yoke 48 in any suitable manner as by pins and washers 74 to have slight angular freedom, and extends to a pin 76 fixed on a bell crank element 78 fulcrumed on a pin 80 carried on abovementioned angle iron 28 generally in line with shaft 24. Angle iron 28 extends a substantial distance to the vicinity of an operator's platform not shown, and a control rod 82 extends along the length of angle iron 28, and is pivoted on a pin 84 on bell crank 78. Rod 82 is connected by a pin 86 with an actuating arm 88 fixed on a shaft 90, pivotally supported in any suitable manner on angle iron 28. Shaft 90 is bent or otherwise provided with a manually actuable lever arm 92 which is preferably, although not necessarily extended toward the operator in a generally horizontal position. In the arrangement shown, it will be apparent that downward movement of lever arm 92 will cause downward movement of rod or link 82, and leftward movement of rod 72. This, through washers 74 will displace yoke 48 to the position indicated in dotted lines in FIG. 2, and cause rotation of cone 38 and shaft 24 in one direction. This direction is preferably such that it will reduce the speed of the driven shaft in the variable belt drive controlled by this mechanism. It is to be understood however, that the arrangement of rods such as 72, 82, bell crank 78, and hand lever 92 may be varied within the scope of the invention to suit the variations in combines or other machines to which the invention may be applied, and without departing from the principles covered in the invention.

The operation of the device is thought to be clear from the foregoing, sufficient to say, the rotation of shaft 30 may be imparted to shaft 24 in either direction by displacing yoke 48 by virtue of the springing of brackets 56 and 58 so as to bring one or the other of frictional elements 38 and 54 into contact with rotating cone or frictional element 34, and when the control is released, the inherent resiliency of brackets 56 and 58 will immediately return yoke 48 to its neutral or inoperative position.

Variations will doubtless occur to those skilled in the art, as for example an arrangement of cables from hand lever 92 for shifting yoke 48 against the resistance of brackets 56 and 58.

It is also to be noted that a large machine such as a combine may suffer appreciable distortion in its passage through the field. However, such distortion will have no effect on the adjustment of the speed or drive since it will not bring either of cones 38 and 54 into contact with cone 34. Furthermore, any disturbance of the center distances or other relations of sprockets 18 and 22 can do nothing more than cause slight idle rotation of shaft 24. Any change in the center distances, for example between washers 74, pivot 80 and pivot 90, owing to the inherent stability of brackets 56 and 58 will cause a mere slight movement or shifting of handle 92 without any significant effect on the position of yoke 48.

It will therefore be apparent that an efficient remote control has been provided for a speed control mechanism, and one which will not be affected by distortion of the machine to which it is applied. Furthermore, a control has been provided which will adjust substantially any type of variable speed drive promptly and accurately, with a very minimum of attention on the part of the operator.

It is also to be noted that brackets 56 and 58 may be installed in any desired orientation with relation to shaft 30 so that chain 20 may extend from sprocket 22 in correct alignment with the sprocket 18, regardless of the position which sprocket 18 may assume by reason of the position of the speed control.

The typical installation would result in a rather sharp upward inclination of shaft 14 and element 12, approximately as illustrated in FIG. 1, but other locations might easily result from application of the apparatus to other combines or other machines.

The invention is not intended to be taken as limited to the installation shown, nor in fact in any manner except as defined by the following claims.

What is claimed as new and desired to be secured by Letters Patent of the United States is:

1. A control for a variable speed drive including
   a support, a variable ratio drive on the support having a control element which is rotatable to vary the ratio of said variable speed drive, a
   driving shaft on said support, a
   frictional driving element on said driving shaft, a
   driven shaft supported from said support, a
   frictionally driven element on said driven shaft spaced from said frictional driving element,
   means for shifting said driven shaft to bring said driven frictional element into driven contact with said frictional driving element, and
   transmission mechanism connected to said driven shaft and to said control element to transmit rotations of said driven shaft to said control element for changing the ratio of said variable speed drive.

2. A control for a variable speed drive including
   a support, a variable ratio drive on the support having a control element which is rotatable to vary the ratio of said variable speed drive, a
   driving shaft on said support, a
   frictional driving element on said driving shaft, a
   driven shaft supported from said support transversely of said driving shaft, a
   frictionally driven element on said driven shaft spaced from said frictional driving element,
   means for shifting said driven shaft axially to bring said driven frictional element into driven contact with said frictional driving element, and
   transmission mechanism connected to said driven shaft and to said control element to transmit rotations of said driven shaft to said control element for changing the ratio of said variable speed drive.

3. A control for a variable speed drive including
   a support, a variable ratio drive on the support having a control element which is rotatable to vary the ratio of said variable speed drive, a control element remote from said variable ratio drive, a
   driving shaft on said support remote from said control element, a
   frictional driving element on said driving shaft, a driven shaft supported from said support, a frictionally driven element on said driven shaft spaced from said frictional driving element, means connected with said remote control element and with said driven shaft for shifting said driven shaft to bring said frictionally driven element into driven contact with said frictional driving element, and transmission mechanism connected to said driven shaft and to said rotatable control element to transmit rotations of said driven shaft to said control element for changing the ratio of said variable speed drive.

4. A control for a variable speed drive including a support, a variable ratio drive on the support having a control element which is rotatable to vary the ratio of said variable speed drive, a driving shaft on said support, a frictional driving element on said driving shaft, a driven shaft support carried on said support, a driven shaft carried on said driven shaft support transversely of said driving shaft, a frictionally driven element on said driven shaft spaced from said frictional driving element, said driven shaft support comprising spaced bearings in which said driven shaft is supported, yielding means fixed to said support in supporting relation to said bearings to be displaced to provide for axial displacement of said driven shaft, means for shifting said driven shaft axially to bring said frictionally driven element into driven contact with said frictional driving element, and transmission mechanism connected to said driven shaft and to said control element to transmit rotations of said driven shaft to said control element for changing the ratio of said variable speed drive.

5. A control for a variable speed drive including a support, a variable ratio drive on the support having a control element which is rotatable to vary the ratio of said variable speed drive, a driving shaft on said support, a frictional driving element on said driving shaft, a driven shaft support carried on said support, a driven shaft carried on said driven shaft support transversely of said driving shaft, a frictionally driven element on said driven shaft spaced from said frictional driving element, said driven shaft support comprising spaced bearings in which said driven shaft is supported, resilient yielding means fixed to said support in supporting relation to said bearings to be displaced to provide for axial displacement of said driven shaft, and constituted to return said shaft after cessation of a displacing force, to its former position, means for shifting said driven shaft axially to bring said frictionally driven element into driven contact with said frictional driving element, and transmission mechanism connected to said driven shaft and to said control element to transmit rotations of said driven shaft to said control element for changing the ratio of said variable speed drive.

6. A control for a variable speed drive including a support, a variable ratio drive on the support having a control element which is rotatable to vary the ratio of said variable speed drive, a driving shaft on said support, a frictional driving element on said driving shaft, a driven shaft support carried on said support, a driven shaft carried on said driven shaft support transversely of said driving shaft, a frictionally driven element on said driven shaft spaced from said frictional driving element, said driven shaft support comprising a yoke member, spaced bearings on said yoke member in which said driven shaft is supported, a pair of flexible leaf-like brackets fixed to said support, spaced axially and disposed transversely of said driven shaft and fixed at points on said driven shaft support spaced axially of said driven shaft, to be flexed to provide for axial displacement of said driven shaft, means for shifting said driven shaft axially to bring said frictionally driven element into driven contact with said frictional driving element, and transmission mechanism connected to said driven shaft and to said control element to transmit rotations of said driven shaft to said control element for changing the ratio of said variable speed drive.

7. A control for a variable speed drive of the type having a driving and a driven shaft journaled on a support, and having a control element rotatable in one direction to increase the driving ratio and in the other direction to decrease the driving ratio, said control comprising a constantly rotating shaft, a frictional drive element on the shaft, a driven shaft supported in a position to extend transversely across the end of the driving shaft, a pair of frictionally driven elements one on each side of said frictional driving element, spaced therefrom and frictionally engageable therewith by axial shifting of the driven shaft, motion transmitting means connected with said driven shaft and with said control element for rotating the latter from rotations of the former, means for supporting said driven shaft from said support including a pair of resiliently flexible brackets fixed to said support and spaced axially of said driven shaft, a bearing on each of said brackets in which said driven shaft is journaled, said brackets being positioned to yieldingly maintain said driven shaft in a position with said frictionally driven elements clear of said frictional drive element, and manually operable means for shifting said driven shaft axially in the direction to bring one of said frictionally driven elements into contact with said frictional drive element to rotate said driven shaft and said control element in one direction, said manually operable means being adapted for shifting said driven shaft in the opposite direction for bringing the other frictionally driven element into contact with said frictional drive element for rotating said driven shaft and said control element in the other direction, the resiliency of said brackets returning said driven shaft to a neutral position wherein said frictionally driven elements are out of contact with said frictional drive element, when said manually operable means is released.

8. A control for a variable speed drive of the type having a driving and a driven shaft journaled on a support, and having a control element rotatable in one direction to increase the driving ratio and in the other direction to decrease the driving ratio, said control comprising a constantly rotating shaft, a frictional drive cone on the shaft, a driven shaft supported in a position to extend transversely across the end of the driving shaft, a pair of frictionally driven elements one on each side of said frictional drive cone, spaced therefrom and frictionally engageable therewith by axial shifting of the driven shaft, motion transmitting means connected with said driven shaft and with said control element for rotating the latter from rotations of the former, means for supporting said driven shaft from said support including a pair of resiliently flexible brackets fixed to said support and spaced axially of said driven shaft, a bearing on each of said brackets in which said driven shaft is journaled, said brackets being positioned to yieldingly maintain said driven shaft in a neutral position with said frictionally driven cone, and manually operable means for shifting said driven shaft axially in the direction to bring one of said frictionally driven cone elements into contact with said frictional drive cone to rotate said driven shaft and said control element in one direction, said manually operable means being adapted for shifting said driven shaft in the opposite direction for bringing the other frictionally driven cone element into contact with said frictional drive cone for rotating said driven shaft and said control element in the other direction, the resiliency of said brackets returning said driven shaft to said neutral position wherein said frictionally driven cone elements are out of contact with said frictional driving cone, when said manually operable means is released.

9. A control for a variable speed drive of the type having a driving and a driven shaft journaled on a support, and having a control shaft rotatable in one direction to increase the driving ratio and in the other direction to decrease the driving ratio, said control comprising a
constantly rotating shaft, a
frictional drive cone on the shaft, a
driven shaft supported in a position to extend transversely across the end of the driving shaft, a pair of
frictionallyy driven cones one on each side of said frictional drive cone, spaced therefrom and frictionally engageable therewith by slight axial shifting of the driven shaft,
motion transmitting means connected with said driven shaft and with said control shaft for rotating the latter from rotations of the former, means for supporting said driven shaft from said support including a pair of resiliently
flexible brackets fixed to said support and spaced axially of said driven shaft, a bearing on each of said brackets in which said driven shaft is journaled, said brackets being positioned to yieldingly maintain said driven shaft in position with said frictionally driven cones clear of said drive cone, and
manually operable means for shifting said driven shaft axially in the direction to bring one of said frictionally driven cones into contact with said frictional drive cone to rotate said driven shaft and said control shaft in one direction, said manually operable means being adapted for shifting said driven shaft in the opposite direction for bringing the other frictionally driven cone into contact with said frictional drive cone for rotating said driven shaft and said control shaft in the other direction, the resiliency of said brackets returning said driven shaft to a control position wherein said frictionally driven cones are out of contact with said frictional driving cone, when said manually operable means is released.

References Cited by the Examiner
UNITED STATES PATENTS

| | | | |
|---|---|---|---|
| 1,255,024 | 1/1918 | Lanich | 74—202 |
| 3,151,492 | 10/1964 | Ozinga | 74—230.17 |

DAVID J. WILLIAMOWSKY, *Primary Examiner.*

L. H. GERIN, *Assistant Examiner.*